US009029735B2

(12) United States Patent
Choi et al.

(10) Patent No.: US 9,029,735 B2
(45) Date of Patent: May 12, 2015

(54) HEATING ELEMENT AND A PRODUCTION METHOD THEREOF

(75) Inventors: Hyeon Choi, Daejeon (KR); Su-Jin Kim, Daejeon (KR); Ki-Hwan Kim, Daejeon (KR); Young-Jun Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 174 days.

(21) Appl. No.: 13/820,446

(22) PCT Filed: Jan. 13, 2012

(86) PCT No.: PCT/KR2012/000323
§ 371 (c)(1), (2), (4) Date: Mar. 1, 2013

(87) PCT Pub. No.: WO2012/096540
PCT Pub. Date: Jul. 19, 2012

(65) Prior Publication Data

US 2013/0153559 A1 Jun. 20, 2013

(30) Foreign Application Priority Data

Jan. 13, 2011 (KR) ........................ 10-2011-0003475

(51) Int. Cl.

| | |
|---|---|
| ***B60L 1/02*** | (2006.01) |
| ***H05B 3/84*** | (2006.01) |
| ***H01R 43/00*** | (2006.01) |
| ***H05B 3/26*** | (2006.01) |
| *H01R 43/20* | (2006.01) |

(52) U.S. Cl.
CPC ............. *H05B 3/84* (2013.01); *Y10T 29/49208* (2015.01); *H05B 2203/011* (2013.01); *H01R 43/00* (2013.01); *H05B 3/265* (2013.01); *H05B 2203/002* (2013.01); *H05B 2203/017* (2013.01)

(58) Field of Classification Search
USPC ................. 219/202, 203, 213, 214, 218, 219; 29/876
See application file for complete search history.

(56) References Cited

U.S. PATENT DOCUMENTS

| | | | |
|---|---|---|---|
| 4,645,912 | A | 2/1987 | Ando et al. |
| 2005/0252908 | A1 | 11/2005 | Weiss |
| 2011/0017726 | A1 | 1/2011 | Choi et al. |
| 2011/0017727 | A1 | 1/2011 | Choi et al. |

FOREIGN PATENT DOCUMENTS

| | | | |
|---|---|---|---|
| JP | 06-302375 | * | 10/1994 |
| JP | 1994-302375 | A | 10/1994 |
| JP | 2000-174486 | * | 6/2000 |

(Continued)

OTHER PUBLICATIONS

Written Search Report dated Sep. 10, 2012.

(Continued)

*Primary Examiner* — Shawntina Fuqua
(74) *Attorney, Agent, or Firm* — McKenna Long Aldridge, LLP

(57) ABSTRACT

The present invention relates to a heating element comprising: two or more heating units comprising two busbars and a conductive heating means electrically connected to the two busbars, in which the busbars of the heating units are connected with each other in series and power per unit area of each of the heating units in the heating element decreases as a length of the busbar increases, and a method of preparing the same.

24 Claims, 7 Drawing Sheets

(56) References Cited

FOREIGN PATENT DOCUMENTS

| | | | |
|---|---|---|---|
| KR | 10-1989-0003052 | B1 | 8/1989 |
| KR | 10-1997-0007640 | B1 | 5/1997 |
| KR | 10-2001-0109507 | A | 12/2001 |
| KR | 10-0316792 | B | 12/2001 |
| KR | 10-2003-0076915 | A | 9/2003 |
| KR | 10-2007-0022332 | * | 2/2007 |
| KR | 10-2007-0022332 | A | 2/2007 |
| KR | 10-2009-0129927 | * | 12/2009 |
| KR | 10-2009-0129927 | A | 12/2009 |

OTHER PUBLICATIONS

Korean Office Action dated Nov. 20, 2012.

* cited by examiner

HEATING ELEMENT AND A PRODUCTION METHOD THEREOF

TECHNICAL FIELD

The application is a national stage application of PCT/KR2012/000323, filed on Jan. 13, 2012, which claims priority from Korean Patent Application No. 10-2011-0003475, filed on Jan. 13, 2011 with the Korean Patent Office, all of which are incorporated herein in their entirety by reference.

The present invention relates to a heating element and a method for preparing the same. More particularly, the present invention relates to a heating element easily controlling a heating value for each part and a method for preparing the same.

BACKGROUND ART

Frost on vehicle windows occurs due to a temperature difference between the outside and the inside of the vehicle in the winter or a rainy day. Further, a dew condensation occurs due to a temperature difference with the inside with a slope and the outside of the slope at an indoor ski resort. In order to solve the problems, heating glass was developed. The heating glass uses a concept of generating heat from a heat line by applying electricity to both ends of the heat line after attaching a heat line sheet to the glass surface or forming the heat line on the glass surface to increase a temperature of the glass surface.

The heating glass for a vehicle or architecture needs to have low resistance in order to smoothly generate the heat and should not offend the eye. For this reason, methods of preparing a known transparent heating glass, by forming a heating layer through a sputtering process of a transparent conductive material such as an indium tin oxide (ITO) or Ag thin film and then connecting an electrode to a front end, have been proposed. However, the heating glass prepared by the methods was difficult to be driven at low voltage of 40 V or less due to high surface resistance. Accordingly, for the heating at the voltage of 40 V or less, attempts are being made to use a metal line.

Meanwhile, in the known heating element, a method of controlling a heating value by a gap between the busbars was attempted, by using a pair of busbars connected with a power supply or using two pairs of busbars connected with each other in parallel. In this case, when the gap between the busbars is fixed, the surface resistance of the heating element between the busbars needs to be controlled in order to control the heating value for each part. In order to control the surface resistance of the heating element, a thickness of a conductive material constituting the heating layer is controlled or the density of a metallic pattern is controlled in the case of using the metallic pattern as a heating pattern. However, in the case where the thickness of the conductive material or the density of the heating pattern is different, there is a problem in that the heating element is easily observed due to a difference in transmittance for each part.

DETAILED DESCRIPTION OF THE INVENTION

Technical Problem

The present invention has been made in an effort to provide a heating element easily capable of controlling a heating value for each part and preventing a user's view from being obstructed, and a method for preparing the same.

Technical Solution

An exemplary embodiment of the present invention provides a heating element, comprising: two or more heating units comprising two busbars and a conductive heating means electrically connected to the two busbars, in which the busbars of the heating units are connected with each other in series and power per unit area of each of the heating units in the heating element decreases as a length of the busbar increases.

Another exemplary embodiment of the present invention provides a method of preparing a heating element, comprising: forming two or more heating units comprising two busbars and a conductive heating means electrically connected to the two busbars on a transparent substrate; and connecting the busbars of the heating units in series, in which power per unit area of each of the heating units in the heating element decreases as a length of the busbar increases.

Advantageous Effects

According to the exemplary embodiments of the present invention, since the power per unit area in one heating unit can be fixed by a length of a busbar by connecting the busbars of two or more heating units in series, a heating value for each part can be easily controlled by controlling the length of the busbar for each heating unit, thereby providing a heating element having no deviation in transmittance or surface resistance between the heating units.

BEST MODE

Hereinafter, exemplary embodiments of the present invention will be described in detail.

A heating element according to the present invention comprises two or more heating units comprising two busbars and a conductive heating means electrically connected to the two busbars, in which the busbars of the heating units are connected with each other in series and power per unit area of each of the heating unit in the heating element decreases as a length of the busbar increases.

In the present invention, a relationship, in which the power per unit area of the heating unit decreases as the length of the busbar increases, is satisfied in the heating element, but the power per unit area of each of the heating units may have no specific correlation with the gap between two busbars in each of the heating units.

Particularly, in the case where the gap between two busbars in each of the heating units is fixed in the heating element, by controlling the length of the busbar, the relationship that the power per unit area of each of the heating units decreases as the length of the busbar increases may be satisfied. Further, even in the case where the length of the busbar of the heating unit is fixed in the heating element, the power per unit area of each of the heating units may have no specific correlation with the gap between two busbars in each of the heating units.

In the present invention, when the conductive heating means is electrically connected to the busbar and voltage is applied to the busbar, the conductive heating means refers to a means to generate heat by self resistance and thermal conductivity. A conductive material formed in a planar shape or a linear shape may be used as the heating means. In the case where the heating means has the planar shape, the heating means may be made of a transparent conductive material, for example, ITO, ZnO, or the like or may be formed of a thin film of an opaque conductive material. In the case where the heating means has the linear shape, the heating means may be made of a transparent or opaque conductive material. In the present invention, in the case where the heating means has the linear shape, even though the material is an opaque material such as a metal, as described below, the heating means may be configured so as not to obstruct the view by controlling a line width and uniformity of a pattern.

In the present invention, for convenience, in the case of the planar shape, the heating means is referred to as a conductive heating surface and in the case of the linear shape, the heating means is referred to as a conductive heating line.

In the case where the heating is performed by using the heating element, an increase width of the temperature is determined by the power per unit area.

Figure 1:
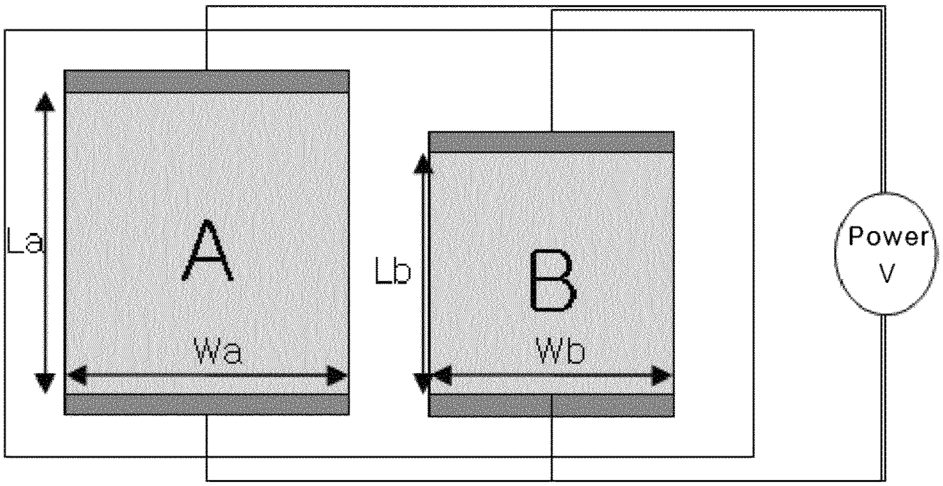
FIG. 1 is an exemplified diagram illustrating a state where two heating units are connected with each other in parallel in the related art.

As shown in FIG. 1, when two or more heating unit comprising a pair of busbars and a conductive heating means provided therebetween are connected with each other in parallel, the power per unit area is determined by gaps La and Lb between the busbars. In FIG. 1, both ends represented by a green color represent the busbars and a region disposed therebetween represents a region with the conductive heating means. In detail, the power of per unit area of region A and region B of FIG. 1 may be calculated as follows.

Region A: $V2/(Rs \times La/Wa)/(La \times Wa) = V2/(Rs \times La2)$

Region B: $V2/(Rs \times Lb/Wb)/(Lb \times Wb) = V2/(Rs \times Lb2)$

In the equations, V is voltage applied by a power supply unit and Rs is surface resistance (Ohm/square) of the heating element.

Figure 2:
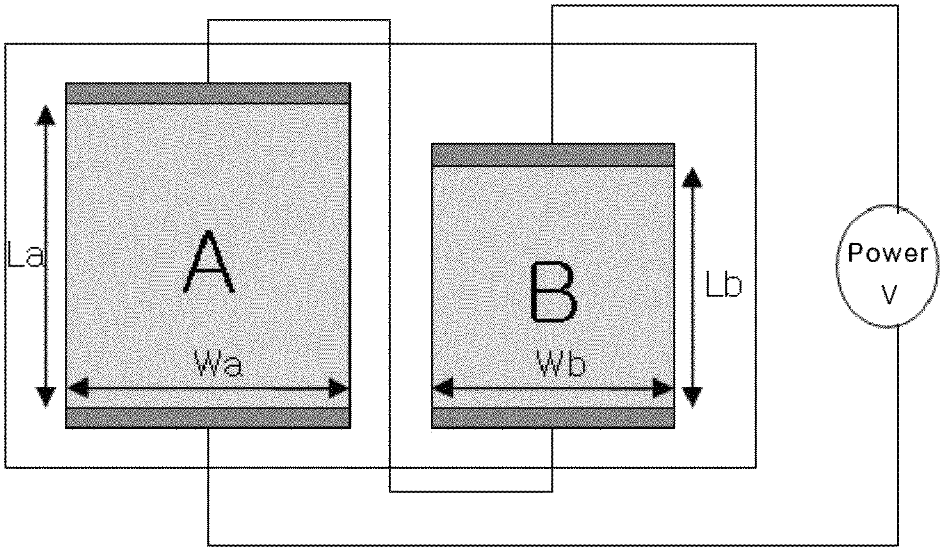
FIG. 2 is an exemplified diagram illustrating a state where two heating units are connected with each other in series according to an exemplary embodiment of the present invention.

However, as shown in FIG. 2, when two or more heating units are connected with each other in series, the power per unit area is determined by lengths Wa and Wb of the busbars. Similarly, even in FIG. 2, both ends represented by a green color represent the busbars and a region disposed therebetween represents a region with the conductive heating means. In detail, the power per unit area of region A and region B of FIG. 2 may be calculated as follows.

Region A: $i2 \times Rs(La/Wa)/(La \times Wa) = i2 \times Rs/Wa2$

Region B: $i2 \times Rs(Lb/Wb)/(Lb \times Wb) = i2 \times Rs/Wb2$

In the equations, V is voltage applied by a power supply unit, Rs is surface resistance (Ohm/square) of the heating element, and I is a constant calculated as follows.

$i = V/Rs(La/Wa + Lb/Wb)$

In the case where a heating value for each part needs to be controlled, a parallel connection mode needs to control the gaps La and Lb between the busbars.

A plurality of heating units are connected with each other to generate heat simultaneously by using the parallel connection mode. Further, the heating value for each part may also be controlled by dividing the heating units in one product. For example, it is better to control the lengths Wa and Wb of the busbars than to control the gaps La and Lb between the busbars in car windows or a display device. Accordingly, in the present invention, the heating value for each part may be easily controlled through the control of the lengths Wa and Wb of the busbars by connecting the two or more heating units in series. When the plurality of heating units are disposed in one product, the distance between the heating units may be 2 cm or less and preferably 0.5 cm or less. When the distance between the heating units is more than 2 cm, the heating in a space between heating units may be deteriorated.

In the present invention, the heating value of the heating unit may be 700 W or less per m2, 300 W or less, and 100 W or more. Since the heating element according to the present invention has excellent heating performance even at low voltage, for example, 30 V or less or 20 V or less, the heating element may be usefully used even in vehicles or the like.

In the present invention, the lengths of the busbars of at least two heating units among the heating units may be different from each other. In the present invention, the heating values of at least two heating units among the heating units may be different from each other.

In the present invention, since the heating value in each heating unit may be controlled by controlling the length of the busbar of each heating unit, the heating values between the heating units may also be controlled to be different from each other or controlled in the same range. However, even while the heating values are controlled as described above, the deviation in the surface resistance or the transmittance between the heating units may be controlled to be within 20%, 10%, or 5%.

Figure 5:
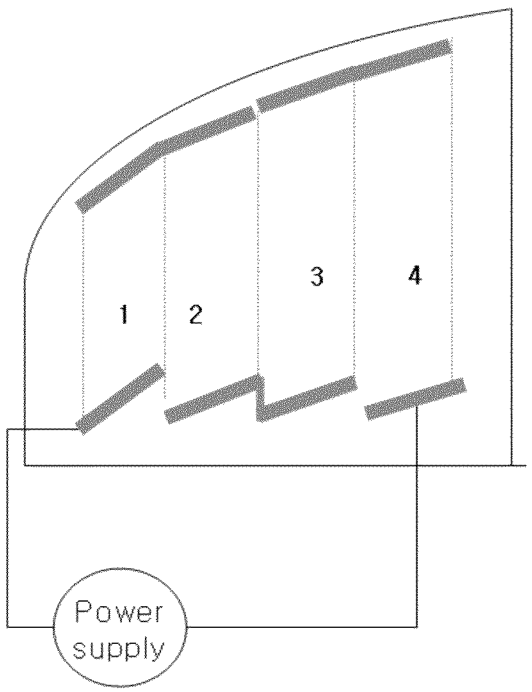
FIG. 5 is an exemplified diagram illustrating the configuration of a heating element according to another exemplary embodiment of the present invention.

In the heating element according to an exemplary embodiment of the present invention, an example in which the heating units are connected with each other in series is shown in FIG. 5. In FIG. 5, since the lengths of the busbars are the same as each other, the heating values in the heating units may be the same as each other. Accordingly, even when an object to which the heating element according to the present invention is applied needs to be configured in a predetermined form such as side windows of a vehicle, the lengths of the busbar are configured to be the same as each other, such that the heating value for each part may be uniform and the surface resistance of the conductive heating surface or the pattern density of the conductive heating line may also be uniform. When the pattern density of the conductive heating line is uniform, it is possible to prevent the pattern of the conductive heating line from blocking the view. For example, according to the present invention, while the temperature deviation in the heating unit is within 20% or 10%, the deviation in the surface resistance or the transmittance between the heating units may be controlled to be within 20%, 10%, or 5%. When the pattern density of the conductive heating line is different among the heating units, the conductive heating line pattern is easily observed by a transmittance difference for each part, but as described above, a difference in the pattern density between the heating units is configured to be small, such that the conductive heating line pattern may not be observable.

In the description, an example configured to have no difference in the heating value between the heating units is described, but by using the same operational principle, while the heating values between the heating units are different from each other, the deviation in the surface resistance or the transmittance between the heating units may be controlled to be within 20%, 10%, or 5%.

In the present invention, the conductive heating line may be a straight line, but may be variously modified such as a curved line, a wave line, a zigzag line, and the like.

In the present invention, the entire pattern of the conductive heating line comprised in each of the two or more heating units may be determined in a pattern shape to be described below at once.

The conductive heating line may be provided in a pattern such as a stripe, a diamond, a square grid, a circle, a wave pattern, a grid, a 2D grid, or the like and is not limited to a predetermined shape, but preferably, the conductive heating line is designed so as to prevent light emitted from a predetermined light source from interfering with an optical property due to diffraction and interference. That is, in order to minimize regularity of the pattern, the conductive heating line may also use a wave pattern, a sine wave pattern, a spacing pattern of a grid structure, and a pattern having irregular thicknesses of a line. If necessary, the shape of the conductive heating line pattern may be a combination of two or more patterns.

The conductive heating line pattern may comprise a irregular pattern.

When a straight line intersecting with the conductive heating line is drawn, the irregular pattern may comprise a pattern of which a ratio of the standard deviation (distance distribution ratio) to an average value of distances between adjacent intersection points of the straight line and the conductive heating line is 2% or more.

The straight line intersecting with the conductive heating line may be a line having the smallest standard deviation of the distances between the adjacent intersection points of the straight line and the conductive heating line. Alternately, the straight line intersecting with the conductive heating line may be a straight line extended in a vertical direction to the tangent of any one point of the conductive heating line. As described above, it is possible to prevent side effects and moire due to the diffraction and interference of the light source by using the conductive heating line pattern.

The number of intersection points with the conductive heating line of the straight line intersecting with the conductive heating line may be 80 or more.

The ratio of the standard deviation (distance distribution ratio) to an average value of distances between adjacent intersection points of the straight line intersecting with the conductive heating line and the conductive heating line may be 2% or more, 10% or more, and 20% or more.

A conductive heating line pattern having a different shape may be provided on at least a part of the surface of the transparent substrate with the heating line pattern as described above.

According to another exemplary embodiment of the present invention, the irregular pattern may be configured by continuously distributed closed figures and comprise a pattern of which a ratio of the standard deviation (area distribution ratio) to an average value of areas of the closed figures is 2% or more. As described above, it is possible to prevent side effects and moire due to the diffraction and interference of the light source by using the conductive heating line pattern.

The number of closed figures may be at least 100.

The ratio of the standard deviation (area distribution ratio) to an average value of areas of the closed figures may be 2% or more, 10% or more, and 20% or more.

A conductive heating line pattern having a different shape may also be provided on at least a part of the surface of the transparent substrate with the heating line pattern of which the ratio of the standard deviation (area distribution ratio) to an average value of areas of the closed figures is 2% or more.

When the patterns are completely irregular, a difference between a sparse portion and a dense portion in a line distribution may occur. There is a problem in that the line distribution is observable no matter how thin the line width may be. In order to solve the visual recognition problem, regularity and irregularity of the may be appropriately harmonized when the heating line is formed in the present invention. For example, a basic unit is set so that the heating line is not observable or local heating does not occur and the heating line may be irregularly formed in the set basic unit. If the above method is used, the visibility may be compensated by preventing the distribution of lines from being concentrated at any one point.

According to another exemplary embodiment of the present invention, the irregular pattern may comprise a conductive heating line pattern of a boundary form of figures configuring a Voronoi diagram.

It is possible to prevent the moire and minimize side effects due to the diffraction and interference of light by forming the conductive heating line pattern in the boundary form of the figures configuring the Voronoi diagram. The Voronoi diagram is a pattern configured by a method of filling a region having the closest distance between each dot and the corresponding dots as compared with the distance from other dots, when dots called Voronoi diagram generators are disposed in a region to be filled. For example, when large-scale discount stores over the country are represented by dots and customers find the closest large-scale discount store, a pattern representing a commercial zone of each discount store may be exemplified. That is, when a space is filled by regular hexagons and dots of the regular hexagons are selected as the Voronoi diagram generators, a honeycomb structure may be the conductive heating line pattern. In the present invention, when the conductive heating line pattern is formed by using the Voronoi diagram generators, there is an advantage of easily determining a complicated pattern shape to minimize the side effects due to the diffraction and interference of light.

In the present invention, the Voronoi diagram generators are regularly or irregularly positioned to use a pattern derived from the generators.

Even in the case where the conductive heating line pattern is formed in a boundary form of the figures that configure the Voronoi diagram, as described above, in order to solve the visual recognition problem, when the Voronoi diagram generator is generated, the regularity and irregularity may be appropriately harmonized. For example, after the area having a predetermined size is set as a basic unit in the area in which the pattern is provided, the dots are generated so that the distribution of dots in the basic unit has the irregularity, thereby manufacturing the Voronoi pattern. If the above method is used, the visibility may be compensated by preventing the distribution of lines from being concentrated at any one point.

As described above, in order to consider the visibility of the heating line or adjust heating density required in the display device, it is possible to control the number of the Voronoi diagram generators per unit area. In this case, when the number of the Voronoi diagram generators per unit area is controlled, the unit area may be 5 $cm^2$ or less and 1 $cm^2$ or less. The number of the Voronoi diagram generators per unit area may be selected in the range of 25 to 2,500/$cm^2$ and in the range of 100 to 2,000/$cm^2$.

At least one of the figures that configure the pattern in the unit area may have a shape different from the rest of the figures.

According to yet another exemplary embodiment of the present invention, the irregular pattern may comprise a conductive heating line pattern of a boundary form of figures formed by at least one triangle configuring a Delaunay pattern.

In detail, the shape of the conductive heating line pattern is a boundary form of the triangles configuring the Delaunay pattern, a boundary form of figures formed by at least two triangles configuring the Delaunay pattern, or a combination form thereof.

It is possible to minimize the moire phenomenon and the side effects due to the diffraction and interference of light by forming the conductive heating line pattern in the boundary form of figures formed by at least one triangle configuring the Delaunay pattern. The Delaunay pattern refers to a pattern formed by drawing triangles so that other dots do not exist in the circumcicle when dots called Delaunay pattern generators are disposed in a region to be filled with patterns and three adjacent dots are connected with each other to draw a triangle and draw a circumcircle comprising all the apexes of the triangle. In order to form the pattern, Delaunay triangulation and circulation may be repeated based on the Delaunay pattern generators. The Delaunay triangulation may be performed by a method of avoiding a slim triangle by maximizing a minimum angle of all angles of the triangle. The concept of the Delaunay pattern was proposed by Boris Delaunay in 1934.

The pattern of the boundary form of figures formed by at least one triangle configuring the Delaunay pattern may use a pattern derived from the generators by regularly or irregularly positioning the Delaunay pattern generators. In the present invention, when the conductive heating line pattern is formed by using the Delaunay pattern generators, there is an advantage of easily determining a complicated pattern shape.

Even in the case where the conductive heating line pattern is formed in the boundary form of figures formed by at least one triangle configuring the Delaunay pattern, as described above, in order to solve the visual recognition problem, when the Delaunay pattern generators are generated, the regularity and irregularity may be appropriately harmonized.

As described above, in order to consider the visibility of the heating line or adjust the heating density required in the display device, it is possible to control the number of the Delaunay pattern generators per unit area. In this case, when the number of the Delaunay pattern generators per unit area is controlled, the unit area may be 5 $cm^2$ or less and 1 $cm^2$ or less. The number of the Delaunay pattern generators per unit area may be selected in the range of 25 to 2,500/$cm^2$ and in the range of 100 to 2,000/$cm^2$.

At least one of the figures configuring the pattern in the unit area may have a shape different from the rest of the figures.

For the uniform heating and the visibility of the heating element, an aperture ratio of the conductive heating line pattern may be constant in unit area. The heating element may have a transmittance deviation of 5% or less to any circle having a diameter of 20 cm. In this case, it is possible to prevent the heating element from being locally heated. Further, in the heating element, the standard deviation of the surface temperature of the transparent substrate after heating may be within 20%. However, for a specific purpose, the conductive heating line may also be disposed so that the temperature deviation occurs in the heating element.

In order to prevent the moire or maximize an effect of minimizing the side effects due to the diffraction and interference of light, the conductive heating line pattern may be formed so that an area of the pattern formed by asymmetrical figures is 10% or more with respect to the entire pattern area. Further, the conductive heating line pattern may be formed so that an area of the figures, in which at least one of lines connecting a central point of any one figure configuring the Voronoi diagram and central points of the adjacent figures forming a boundary with the figure has a length different from the rest of the lines, is 10% or more with respect to the entire area of the conductive heating line pattern. Further, the conductive heating line pattern may be formed so that an area of the pattern formed by the figures, in which at least one side of the figure formed by at least one triangle configuring the Delaunay pattern has a length different from the rest of the sides, is 10% or more with respect to the entire area of the conductive heating line pattern.

When the heating line pattern is prepared, a large-area pattern may also be prepared by using a method of using a method of connecting a limited area repetitively after designing the pattern in the limited area. In order to repetitively connect the patterns, the repetitive patterns may be connected with each other by fixing the positions of the dots of each side. In this case, the limited area may have an area of 1 $cm^2$ or more and 10 $cm^2$ or more in order to minimize the moire phenomenon and the diffraction and interference of light due to the repeat.

In the present invention, first, after determining a desired pattern shape, the conductive heating line pattern having a thin line width and precision may be formed on the transparent substrate by using a printing method, a photolithography method, a photography method, a method using a mask, a sputtering method, an inkjet method, or the like. The pattern shape may be determined by using the Voronoi diagram generators or the Delaunay pattern generators and as a result, the complicated pattern shape may be easily determined. Herein, the Voronoi diagram generators and the Delaunay pattern generators refer to dots disposed so as to form the Voronoi diagram and the Delaunay pattern as described above, respectively. However, the scope of the present invention is not limited thereto and the desired pattern shape may also be determined by using other methods.

The printing method may be performed by transferring and firing a paste comprising a conductive heating line material on the transparent substrate in a desired pattern shape. The transfer method is not particularly limited, but the desired pattern may be transferred on the transparent substrate by forming the pattern on a pattern transfer medium such as an intaglio or a screen and using the formed pattern. A method of forming the pattern form on the pattern transfer medium may use a known method in the art.

The printing method is not particularly limited and may use a printing method such as an offset printing method, a screen printing method, a gravure printing method, or the like. Further, the offset printing method may be performed by primarily transferring an intaglio with a silicon rubber called a blanket after filling a paste in the intaglio with the engraved pattern and pressing and then, secondarily transferring the intaglio by pressing the blanket and the transparent substrate. The screen printing method may be performed by directly positioning a paste on a substrate through a hollow screen while pressing a squeeze after positioning the paste on the screen having the pattern. The gravure printing method may be performed by rolling a blanket engraved with a pattern on a roll and filling a paste in the pattern to be transferred to the transparent substrate. In the present invention, the methods may be used in combination in addition to the methods. Further, other printing methods known to those skilled in the art may also be used.

In the case of the offset printing method, since the paste is almost transferred to the transparent substrate such as glass due to a releasing property of the blanket, a separate blanket cleaning process is not required. The intaglio may be fabricated by precisely etching the glass on where a desired conductive heating line pattern is engraved and also, for durability, a metal or diamond-like carbon (DLC) may be coated on the glass surface. The intaglio may also be fabricated by etching a metal plate.

In the present invention, in order to implement a more precise conductive heating line pattern, the offset printing method may be used. The offset printing method may be performed by filling the paste in the pattern of the intaglio by using a doctor blade and then, performing a primary transfer by rotating the blanket at the first step and performing a secondary transfer on the surface of the transparent substrate by rotating the blanket at the second step.

The present invention is not limited to the above printing methods and may also use a photolithography process. For example, the photolithography process may be performed by forming a conductive heating line pattern material layer on the entire surface of the transparent substrate, forming a photoresist layer thereon, patterning the photoresist layer by a selective exposing and developing process, etching the conductive heating line pattern material layer by using the patterned photoresist layer as a mask to pattern the conductive heating line, and then, removing the photoresist layer.

The conductive heating line pattern material layer may also be formed by laminating a metal thin film such as copper, aluminum, and silver on the transparent substrate by using an adhesive layer. Further, the conductive heating line pattern material layer may also be a metal layer formed on the transparent substrate by using a sputtering or physical vapor deposition method. In this case, the conductive heating line pattern material layer may also be formed in a multilayer structure of a metal having good electrical conductivity such as copper, aluminum, and silver and a metal having good attachment with the substrate and dark colors such as Mo, Ni, Cr, and Ti. In this case, the thickness of the metal thin film may be 20 micrometers or less and 10 micrometers or less.

In the present invention, the photoresist layer may also be formed by using a printing process instead of the photolithography process in the photolithography process.

Further, the present invention may also use the photography method. For example, after a photosensitive material comprising silver halide is coated on the transparent substrate, the pattern may also be formed by selectively exposing and developing the photosensitive material. A more detailed example is as follows. First, a negative photosensitive material is coated on a substrate to form a pattern. In this case, as the substrate, a polymer film such as PET, acetyl celluloid, and the like may be used. Herein, a polymer film member coated with the photosensitive material is called a film. The negative photosensitive material may be generally configured of silver halide mixing a little AgI with AgBr reacting to light very sensitively and regularly. Since an image developed after photographing a general negative photosensitive material is a negative image having an opposite contrast to a subject, the photographing may be performed by using a mask having a pattern shape to be formed, preferably, an irregular pattern shape.

In order to increase conductivity of the heating line pattern formed by using the photolithography and photography processes, a plating process may further be performed. The plating may be performed by using an electroless plating method, a plating material may use copper or nickel, and after performing copper plating, nickel plating may be performed thereon, but the scope of the present invention is not limited thereto.

Further, the present invention may also use the method using a mask. For example, after a mask having a heating line pattern shape is disposed near a substrate, the heating line pattern material may also be patterned on the substrate by using a deposition method. In this case, the deposition method may use a heat deposition method due to heat or electron beam, a physical vapor deposition (PVD) method such as sputtering, and a chemical vapor deposition (CVD) method using an organometal material.

In the present invention, the heating element may be provided on a transparent substrate.

The transparent substrate is not particularly limited, but light transmittance may be 50% or more and 75% or more. In detail, the transparent substrate may use glass, a plastic substrate, or a plastic film. In the case of using the plastic film, after forming the conductive heating line pattern, the glass may be attached to at least one surface of the substrate. In this case, the glass or the plastic substrate may be attached to the surface with the conductive heating line pattern of the transparent substrate. As the plastic substrate or film, a material known in the art may be used, and for example, may be a film having the visible-light transmittance of 80% or more such as polyethylene terephthalate (PET), polyvinylbutyral (PVB), polyethylene naphthalate (PEN), polyethersulfon (PES), polycarbonate (PC), and acetyl cellulose. A thickness of the plastic film may be 12.5 to 500 micrometers and 50 to 250 micrometers.

In the present invention, as the conductive heating line material, a metal having excellent thermal conductivity may be used. Further, a resistivity value of the conductive heating line material may be 1 microOhm cm or more to 200 microOhm cm or less. As a detailed example of the conductive heating line material, copper, silver, carbon nanotube (CNT), and the like may be used and silver is most preferred. The conductive heating line material may be used in a particle form. In the present invention, as the conductive heating line material, copper particles coated with silver may be used.

In the present invention, when the conductive heating line is prepared by using a printing process using a paste, the paste may further comprise an organic binder in addition to the aforementioned conductive heating line material in order to facilitate the printing process. The organic binder may have volatility during a firing process. The organic binder may comprise a polyacrylic resin, a polyurethane resin, a polyester resin, a polyolefin resin, a polycarbonate resin, a cellulose resin, a polyimide resin, a polyethylene naphthalate resin, a modified epoxy, and the like, but is not just limited thereto.

In order to improve adhesion of the paste to the transparent substrate such as glass, the paste may further comprise a glass frit. The glass frit may be selected from a commercial product, but it is good to use an eco-friendly glass frit without a lead content. In this case, a size of the used glass frit may have an average aperture of 2 micrometers or less and may have a maximum aperture of 50 micrometers or less.

If necessary, a solvent may be further added to the paste. The solvent comprises butyl carbitol acetate, carbitol acetate, cyclohexanon, cellosolve acetate, terpineol, and the like, but the scope of the present invention is not limited to the examples.

In the present invention, when the paste comprising the conductive heating line material, the organic binder, the glass frit, and the solvent is used, weight ratios of respective ingredients may be 50 to 90 wt % of the conductive heating line material, 1 to 20 wt % of the organic binder, 0.1 to 10 wt % of the glass frit, and 1 to 20 wt % of the solvent.

In the present invention, in the case of using the aforementioned paste, a heating line having conductivity is formed through a firing process after printing the paste. In this case, a firing temperature is not particularly limited, but may be 500 to 800° C. and 600 to 700° C. When the transparent substrate forming the heating line pattern is glass, if necessary, the glass may be molded so as to be suitable for a desired use such as a architecture, a vehicle, or the like during the firing process. For example, when glass for a vehicle is molded in a curved surface, the paste may also be fired. Further, in the case where the plastic substrate or film is used as the transparent substrate forming the conductive heating line pattern, the firing may be performed at a relatively low temperature. For example, the firing may be performed at 50 to 350° C.

A line width of the conductive heating line may be 100 micrometers or less and 30 micrometers or less, preferably 25 micrometers or less and 10 micrometers or less, and more preferably 7 micrometers or less and 5 micrometers or less. The line width of the conductive heating line may be 0.1 micrometer or more and 0.2 micrometer or more. A distance between the lines of the conductive heating line may be 30 mm or less, 0.1 micrometer to 1 mm, 0.2 micrometer to 600 micrometers or less, and 250 micrometer or less.

A line height of the heating line may be 100 micrometers or less, 10 micrometers or less, and 2 micrometers or less. In the present invention, the line width and the line height of the heating line may be uniform by the aforementioned methods.

In the present invention, uniformity of the heating line may be in the range of ±3 micrometers in the case of the line width and in the range of ±1 micrometer in the case of the line height.

In the present invention, as the conductive heating surface may be formed of a transparent conductive material. As an example of the transparent conductive material, ITO and ZnO based transparent conductive oxides may be comprised. The transparent conductive oxides may be formed by a sputtering method, a sol-gel method, and a vapor deposition method and may have a thickness of 10 to 1,000 nm. Further, the transparent conductive oxides may also be formed by coating an opaque conductive material with a thickness of 1 to 100 nm. As the opaque conductive material, Ag, Au, Cu, Al, and carbon nanotube may be comprised.

The heating element according to the present invention may further comprise a power supply unit connected to the busbar. In the present invention, the busbar and the power supply unit may be formed by using a known method in the art. For example, the busbar may also be formed simultaneously with the formation of the conductive heating means and may also be formed by using the same or different printing method after forming the conductive heating means. For example, after the conductive heating line is formed by using an offset printing method, the busbar may be formed through the screen printing. In this case, a thickness of the busbar may be 1 to 100 micrometers and 10 to 50 micrometers. When the thickness is less than 1 micrometer, since contact resistance between the conductive heating means and the busbar increases, local heat of the contact portion may be generated and when the thickness is more than 100 micrometers, costs of electrode materials may increase. The connection between the busbar and the power supply unit may be performed through soldering and physical contact with a structure having good conductive heating.

In order to cover the busbar, a black pattern may be formed. The black pattern may be printed by using a paste containing cobalt oxide. In this case, as the printing method, the screen printing is preferably used and the thickness is preferably 10 to 100 micrometers. The conductive heating means and the busbar may also be formed before or after forming the black pattern.

The heating element according to the present invention may further comprise an additional transparent substrate provided on the surface with the conductive heating means of the transparent substrate. As described above, the additional transparent substrate may use glass, a plastic substrate, or a plastic film. An adhesive film may be interposed between the conductive heating means and the additional transparent substrate during the attachment of the additional transparent substrate. A temperature and a pressure may be controlled during the adhering process.

As a material of the adhesive film, any material having adhesion and becoming transparent after adhering may be used. For example, the material may use a PVB film, an EVA film, a PU film, or the like, but is not limited to those examples. The adhesive film is not particularly limited, but the thickness thereof may be 100 to 800 micrometers.

In one particular exemplary embodiment, a primary adhering is performed by inserting the adhesive film between the transparent substrate with the conductive heating means and the additional transparent substrate and removing air by increasing a temperature by putting and depressurizing them in a vacuum bag or increasing a temperature using a hot roll. In this case, a pressure, a temperature, and a time vary according to a kind of adhesive film, but generally, a temperature from room temperature to 100° C. may be gradually increased under a pressure of 300 to 700 torr. In this case, generally, the time may be within 1 hour. A laminated body pre-adhered after finishing the primary adhering is secondarily adhered through an autoclaving process which is performed by applying a pressure and increasing a temperature in an autoclave. The secondary attachment varies according to a kind of adhesive film, but may be performed at a pressure of 140 bar or more and a temperature of about 130 to 150° C. for 1 hour to 3 hours or about 2 hours and then, slow cooling may be performed.

In another detailed exemplary embodiment, unlike the aforementioned 2-step adhering process, an adhering method in one step may be used by using vacuum laminator equipment. While the temperature is increased up to 80 to 150° C. stepwise and cooled slowly, the adhering may be performed by reducing the pressure (to 5 mbar) up to 100° C. and thereafter, increasing the pressure (to 1,000 mbar).

The heating element according to the present invention may have a form forming a curved surface.

In the heating element according to the present invention, when the heating means is a linear shape, an aperture ratio of the conductive heating line pattern, that is, a ratio of a region which is not covered by the pattern may be 70% or more. The heating element according to the present invention has an excellent heating characteristic capable of increasing the temperature while the aperture ratio is 70% or more and a temperature deviation is maintained at 10% or less within 5 minutes after the heating operation.

The heating element according to the present invention may be connected to the power supply for heating and in this case, the heating value may be 700 W or less per m2, 300 W or less, and 100 W or more. Since the heating element according to the present invention has excellent heating performance even at low voltage, for example, 30 V or less or 20 V or less, the heating element may be usefully used even in vehicles or the like. The resistance in the heating element may be 5 ohm/square or less, 1 ohm/square or less, and 0.5 ohm/square or less. The heating element according to the present invention may be applied to various transport vehicles such as a car, a ship, a train, a high-speed train, an airplane, and the like, glass used in a house or other buildings, or a display device. Particularly, since the heating element according to the present invention may have the excellent heating characteristic even at low voltage, minimize the side effects due to the diffraction and interference of the light source after sunset, and be invisibly formed with the aforementioned line width as described above, the heating element may also be applied to front windows of transport vehicles such as a car unlike the related art.

Further, the heating element according to the present invention may be applied to the display device.

In the case of a 3D TV based on a liquid crystal which has been recently introduced, a 3D image is being implemented due to binocular disparity. A method most commonly used in order to generate the binocular disparity is to use glasses having shutters synchronized with a read frequency of a liquid crystal display. In the method, when left-eye and right-eye images need to be alternately displayed in the liquid crystal display and in this case, a change speed of the liquid crystal is slow, overlapping of the left-eye image and the right-eye image may occur. A viewer experiences an unnatural 3D effect due to the overlapping and as a result, dizziness or the like may occur.

A moving speed of the liquid crystal used in the liquid crystal display may be changed according to an ambient temperature. That is, when the liquid crystal display is driven at a low temperature, a changed speed of the liquid crystal becomes slower and when the liquid crystal display is driven at a high temperature, a changed speed of the liquid crystal becomes faster. Currently, in the case of the 3D TV using the liquid crystal display, heat generated from a backlight unit may influence a liquid crystal speed. Particularly, in the case where the backlight unit of a product known as an LED TV is disposed only at an edge of the display, since the heat generated from a backlight unit increases only a temperature around the backlight unit, a deviation in a liquid crystal driving speed may occur and as a result, nonideal implementation of the 3D image may be more deteriorated.

Accordingly, in the present invention, the aforementioned heating element is applied to the display device, particularly, the liquid crystal display, such that an excellent display characteristic may be represented even in an initial driving at a low temperature and the display characteristic may be uniformly provided in the entire display screen even in the case where the temperature deviation occurs in the entire display screen according to a position of the light source like the case where the light source such as an edge-type light source is disposed at the side. Particularly, as the heating function is provided to the liquid crystal display, the ambient temperature of the liquid crystal is increased and as a result, a high change speed of the liquid crystal is implemented, thereby minimizing distortion of the 3D image occurring in the 3D display device.

When the heating element according to the present invention is comprised in the display device, the display device may comprise a display panel and a heating element provided on at least one side of the display panel. In the case where the display device comprises the edge-type light source, the heating unit disposed close to the light source in the heating element has a relatively longer length of the busbar and the heating unit disposed far away from the light source has a relatively shorter length of the busbar, thereby compensating the temperature deviation according to a light source. As described above, the heating is locally performed in order to compensate the temperature deviation and the surface resistance of the conductive heating surface or the pattern density of the conductive heating line becomes uniform in the entire display screen unit of the display device, thereby ensuring visibility.

The heating element may be provided on the additional transparent substrate and may also be provided on one constituent element of the display panel or other constituent elements of the display device.

For example, the display panel may comprise two sheets of substrates and a liquid crystal cell comprising a liquid crystal material sealed between the substrates and the heating element may be provided at the inside or the outside of at leas one of the substrates. Further, the display panel may comprise polarizing plates provided at both sides of the liquid crystal cell, respectively and the heating element may be provided on a retardation film provided between the liquid crystal cell and at least one of the polarizing plates. In the case where the polarizing plate comprises a polarizing film and at least one protective film, the heating element may also be provided on at least one side of the protective film.

Further, the display device may comprise a backlight unit. The backlight unit may comprise a direct-type light source or an edge-type light source. In the case of the backlight unit may comprise the edge-type light source, the backlight unit may further comprise a light guide plate. The light source may be disposed at one or more edges of the light guide plate. For example, the light source may be disposed at only one side of the light guide plate and may be disposed at two to four edges. The heating element may be provided at the front or the rear of the backlight unit. Further, the heating element may also be provided at the front or the rear of the light guide plate.

In the case where the heating element is provided on the additional transparent substrate, the heating element may be provided at the front or the rear of the display panel, may be provided between the liquid crystal cell and at least one polarizing plate, and may be provided between the display panel and the light source and at the front or the rear of the light guide plate.

In the case where the heating means of the heating element has a linear shape, the conductive heating line pattern may comprise an irregular pattern. It is possible to prevent the moire phenomenon of the display device by the irregular pattern.

The display device comprises the heating element and the configuration of the heating element may be controlled so as to prevent excessive heating and power consumption in electronic products. In detail, the configuration of the heating film comprised in the display device according to the present invention may be controlled so that power consumption, voltage, and a heating value are in the range to be described below.

When the heating element comprised in the display device according to the present invention is connected to the power supply, the power consumption of 100 W or less may be used. In the case where the power consumption of more than 100 W is used, the distortion of the 3D image due to the temperature increase is improved, but power-saving performance of a product may be influenced according to increase in the power consumption. Further, the heating element of the display device according to the present invention may use voltage of 20 V or less and voltage of 12 V or less. When the voltage is more than 20 V, since a risk of an electric shock due to a short circuit occurs, the voltage may be used as low as possible.

A surface temperature of the display device using the heating element according to the present invention is controlled at 40° C. or less. When the temperature is increased to more than 40° C., the distortion of the 3D image may be minimized, but the power consumption may be more than 100 W. When the heating element is connected to the power supply, the heating value may be 400 W or less per m2 and 200 W or less.

The display device using the heating element according to the present invention comprises the aforementioned heating element and may comprise a controller for controlling a surface temperature in order to implement a power-saving product which the electrical products seek in present. As described above, the controller may control the surface temperature of the display device at 40° C. or less. The controller may also have a heating function for only a predetermined time by using a timer and may also have a function of increasing the temperature only up to an optimal temperature and blocking the power supply by attaching a temperature sensor to the surface of the display device. The controller may perform a function for minimizing the power consumption of the display device.

Figure 6:
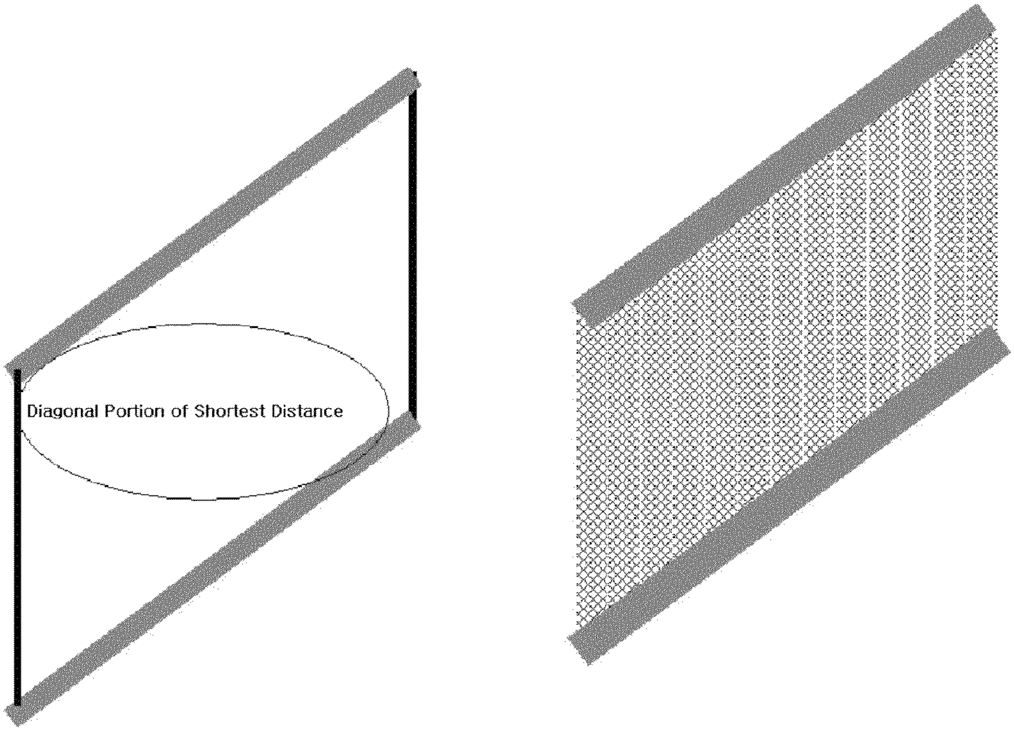
FIG. 6 is an exemplified diagram illustrating a state where a heating means is shorted in a heating unit of a heating element according to another exemplary embodiment of the present invention.

In the heating element according to the present invention, in the case where at least one busbar of at least one of the heating units is diagonally disposed, the conductive heating means of the heating unit comprises a current-shorted portion, such that the current is concentrated toward a diagonal line which is the shortest distance between the busbars, thereby preventing the local heating from occurring. For example, in the heating element according to the present invention, in order to equally control the lengths of the busbars between the heating units, for example, in the case where the busbar is diagonally disposed as shown in FIG. 5, the current may be concentrated toward a diagonal line which is the shortest distance between the busbars in the heating unit and as a result, the local heating may occur around the diagonal line of the shortest distance. In order to prevent the problem, in the region where the busbar is diagonally disposed, the conductive heating means may also be electric-shorted with an interval of 0.1 to 20 mm along the busbar. As described above, an example where the conductive heating means is electric-shorted is shown in FIG. 6. In this case, for the electric short, in the case of the heating surface, the conductive film may be removed by using a laser and in the case of the heating line, the heating line may also be disconnected during the initial-patterning.

Hereinafter, the present invention will be described in more detail with reference to Examples. However, the following Examples just exemplify the present invention and the scope of the present invention is not limited to the following Examples.

EXAMPLE

Example 1

Figure 3:
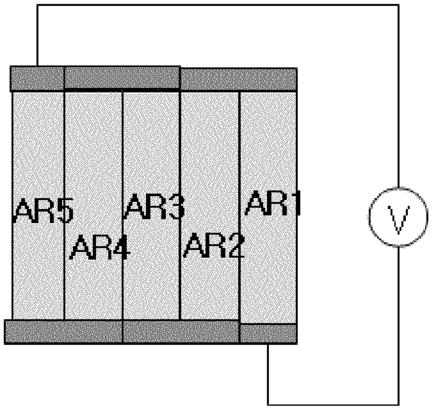
FIG. 3 is an exemplified diagram illustrating a state where five heating units are connected with each other in series according to another exemplary embodiment of the present invention.

Heating units were disposed on a transparent substrate in a structure shown in FIG. 3. In this case, a distance between the heating units is 1 mm and a length W of a busbar was configured as the following Table 1. The surface resistance of a conductive heating line provided between the busbars of each heating unit was 0.33 ohm/square, the voltage and the current were 21.6 V and 3.8 A, respectively, the power was 82.1 W, and the length L between the busbars was 70 cm.

Figure 4:
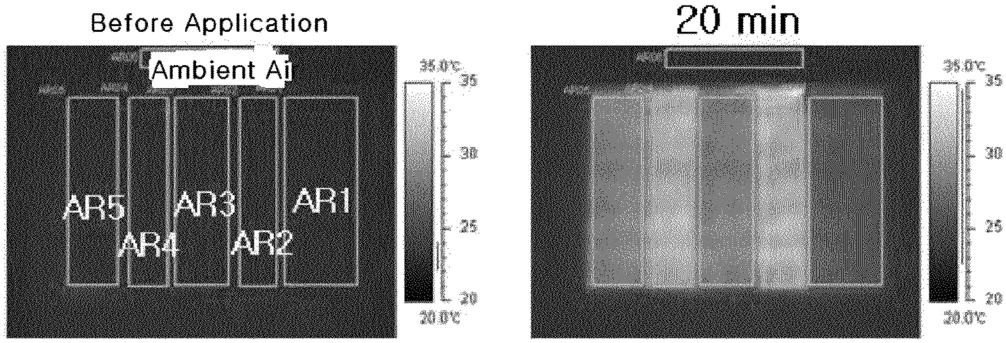
FIG. 4 is a photograph illustrating heated states before voltage is applied to a heating element shown in FIG. 3 and at 20 minutes after the application of the voltage.

Average temperatures of the heating element prepared in Example 1 which were measured before applying the voltage and at 20 minutes after applying the voltage were shown in FIG. 4 and Table 1. Further, a relationship between a length W of the busbar and a temperature rise was shown in FIG. 7.

TABLE 1

| Heating unit No. | Length of busbar (W, cm) | Power per unit area | Average temperature: Before applying voltage | Average temperature: 20 minutes after applying voltage | Increasing width in temperature (° C.) |
|---|---|---|---|---|---|
| AR1 | 26.7 | 67 | 23.1 | 26.2 | 3.2 |
| AR2 | 17.5 | 156 | 23.1 | 30.8 | 7.7 |
| AR3 | 20.7 | 111 | 23.1 | 28.6 | 5.5 |
| AR4 | 17.5 | 156 | 23.1 | 30.8 | 7.7 |
| AR5 | 20.7 | 111 | 23.1 | 28.6 | 5.5 |
| Ambient air | — | | 22.8 | 22.9 | 0.1 |

Figure 7:
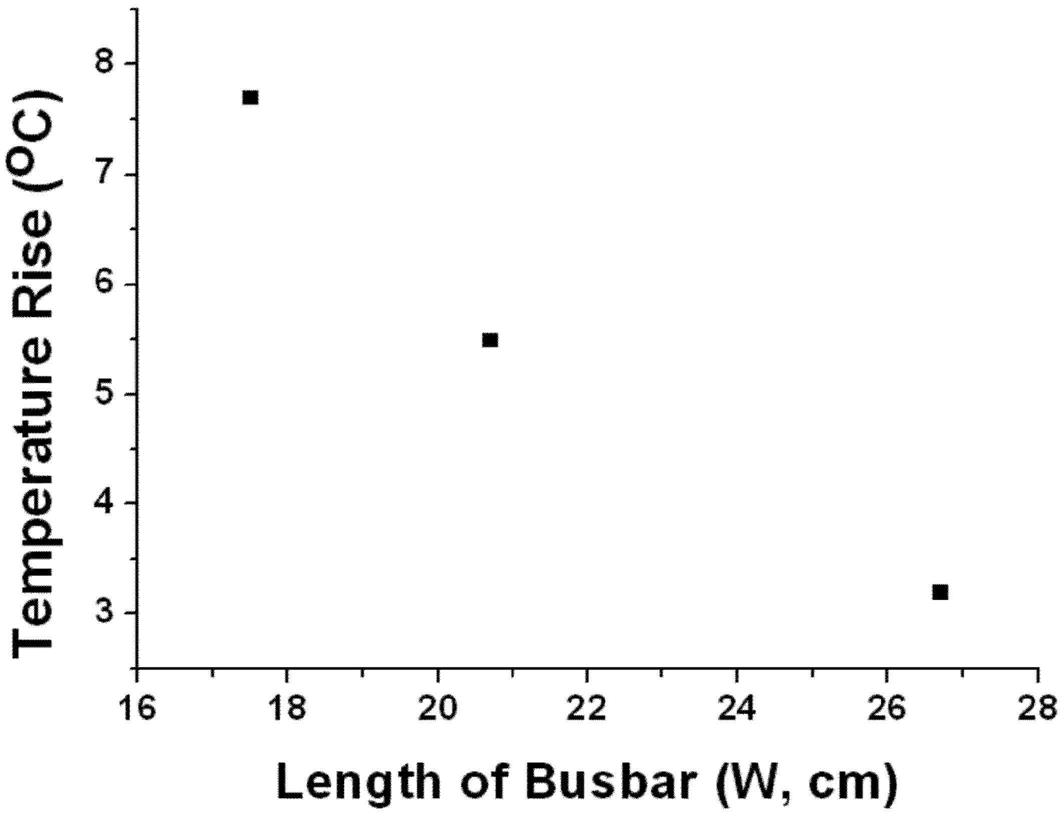
FIG. 7 is a diagram illustrating a relationship between a length W of a busbar and a temperature rise according to a first exemplary embodiment of the present invention.

When examining the relationship between the length W of the busbar and the temperature rise shown in FIG. 7, as the length of the busbar increased, the temperature rise decreased.

Example 2

Figure 8:
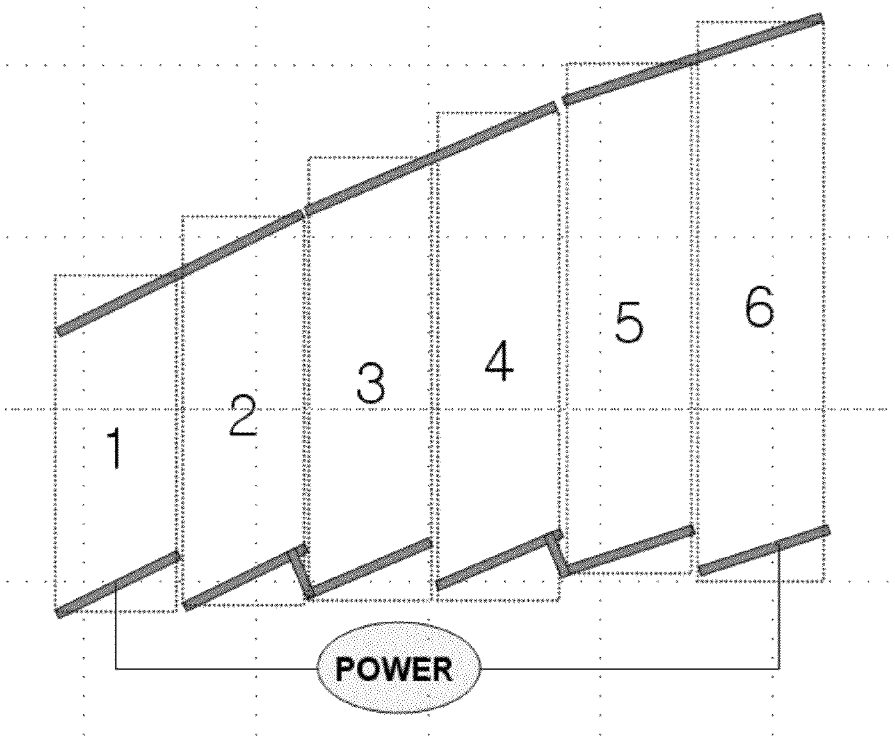
FIG. 8 is an exemplified diagram illustrating a state where six heating units are connected with each other in series according to another exemplary embodiment of the present invention.

Heating units were disposed only at a square represented by a dotted line on a transparent substrate in a structure shown in FIG. 8. In this case, a distance between the heating units is 1 mm and a length W of a busbar and a gap L between the busbars were configured as the following Table 2. The surface resistance of a conductive heating line provided between the busbars of each heating unit was 0.33 ohm/square, the voltage and the current were 14 V and 2.4 A, and the power was 33.6 W.

Figure 9:
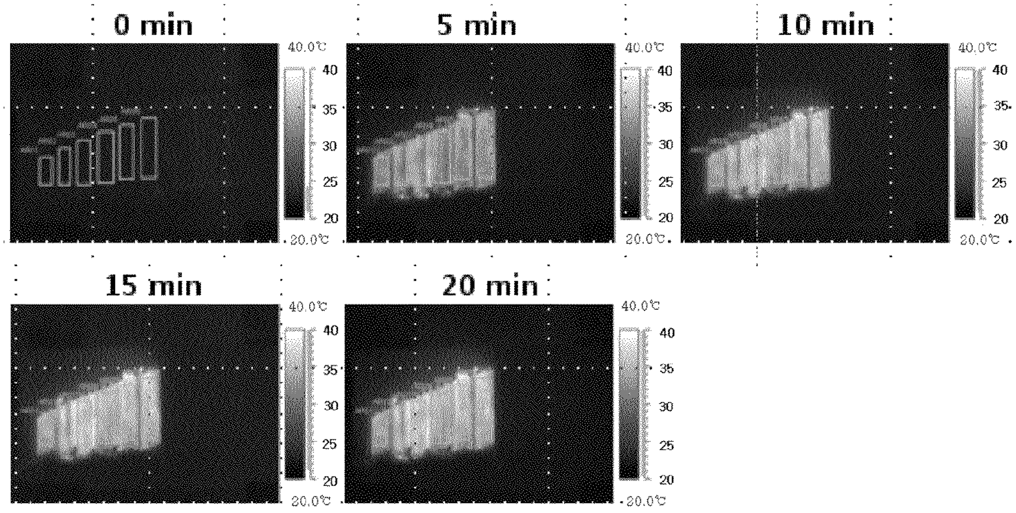
FIG. 9 is a photograph illustrating heated states before voltage is applied to a heating element shown in FIG. 8 and at 20 minutes after the application of the voltage.

Average temperatures of the heating element prepared in Example 2 which were measured before applying the voltage and at 20 minutes after applying the voltage were shown in FIG. 9 and Table 2. Further, a relationship between the gap L between the busbars and a temperature rise was shown in FIG. 10.

TABLE 2

| Heating unit No. | Gap between busbars (L, cm) | Length of busbar (W, cm) | Power per unit area | Average temperature Before applying voltage | Average temperature 20 minutes after applying voltage | Increasing width in temperature (° C.) |
|---|---|---|---|---|---|---|
| 1 | 14.95 | 7.5 | 338 | 22.2 | 33.6 | 11.4 |
| 2 | 17.90 | 7.5 | 338 | 22.2 | 34.5 | 12.3 |
| 3 | 20.90 | 7.5 | 338 | 22.3 | 35.8 | 13.5 |
| 4 | 23.05 | 7.5 | 338 | 22.4 | 34.6 | 12.2 |
| 5 | 25.85 | 7.5 | 338 | 22.5 | 35.4 | 12.9 |
| 6 | 27.70 | 7.5 | 338 | 22.5 | 35.1 | 12.6 |

Figure 10:
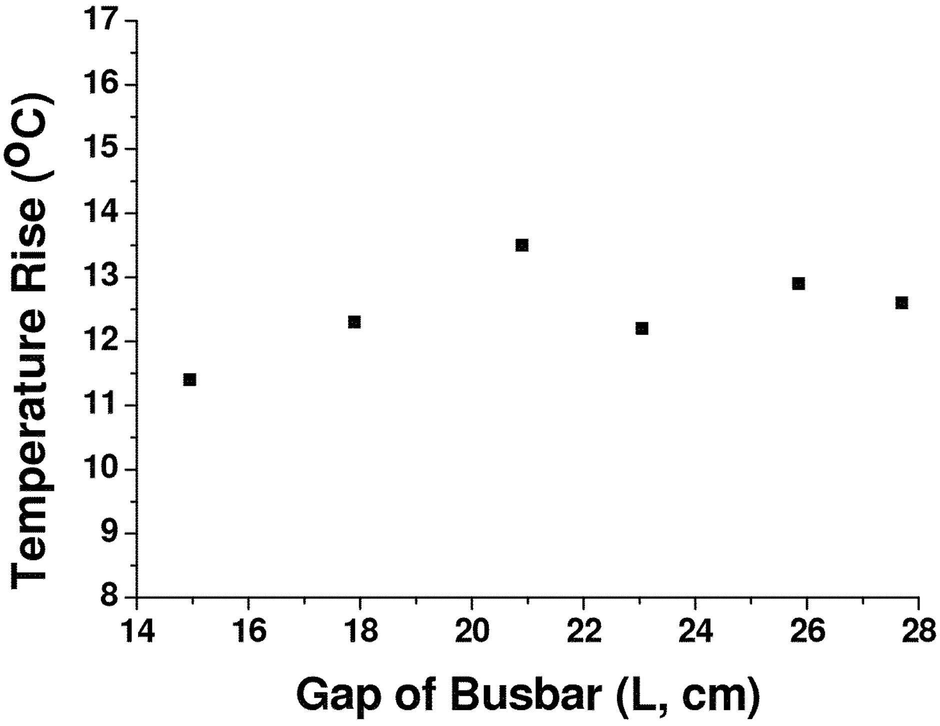
FIG. 10 is a diagram illustrating a relationship between a gap L between busbars and a temperature rise according to the first exemplary embodiment of the present invention.

When examining the relationship between the gap L between the busbars and the temperature rise shown in FIG. 10, when the lengths of the busbars were the same, the gap L between the busbars and the temperature rise had no correlation.

As described above, in the present invention, since the power per unit area in one heating unit may be fixed by a length of a busbar by connecting the busbars of two or more heating units in series, a heating value for each part may be easily controlled by controlling the length of the busbar for each heating unit, thereby providing a heating element having no difference in transmittance or surface resistance between the heating units.

The invention claimed is:

1. A heating element, comprising:

two or more heating units, each heating unit comprising:

two busbars; and a conductive heating means electrically connected to the two busbars and positioned between the busbars, thereby separating the busbars by a gap, wherein the busbars of the respective heating units are connected in series, wherein the power per unit area of each heating unit is determined by length of the respective busbars and does not correlate with the gap between the busbars of the respective heating unit.

2. The heating element according to claim 1, wherein the gap between the two busbars in the heating unit is fixed in the heating element and the power per unit area of each of the heating units decreases as a length of the busbar increases.

3. The heating element according to claim 1, wherein the length of the busbar of the heating unit is fixed in the heating element and the power per unit area of each of the heating units has no correlation with a gap between the two busbars in each of the heating units.

4. The heating element according to claim 1, wherein the gap between the heating units is 2 cm or less.

5. The heating element according to claim 1, wherein the conductive heating means is a conductive heating surface or a conductive heating line.

6. The heating element according to claim 1, wherein a temperature deviation in the heating unit is within 20% and a sheet resistance or a transmittance deviation between the heating units is within 20%.

7. The heating element according to claim 1, wherein the lengths of the busbars of at least two heating units among the heating units are different from each other.

8. The heating element according to claim 1, wherein the heating values of at least two heating units among the heating units are different from each other.

9. The heating element according to claim 5, wherein the conductive heating line is disposed so as to have an irregular pattern.

10. The heating element according to claim 9, wherein the irregular pattern comprises a boundary form of figures forming a Voronoi diagram or a boundary form of figures configured by at least one triangle forming a Delaunay pattern.

11. The heating element according to claim 1, wherein the heating element comprises a transparent substrate with the busbar and the conductive heating means.

12. The heating element according to claim 11, wherein the heating element further comprises a transparent substrate disposed on the surface with the busbar and the conductive heating means of the transparent substrate.

13. The heating element according to claim 5, wherein the conductive heating line is a metallic line.

14. The heating element according to claim 5, wherein the line width of the conductive heating line is 100 micrometers or less, the distance between the lines is 30 mm or less, and the line height is 100 micrometers or less.

15. The heating element according to claim 5, wherein the conductive heating surface is a film made of a transparent conductive material or a thin film made of an opaque conductive material.

16. The heating element according to claim 1, wherein at least one busbar of at least one of the heating units is diagonally disposed and the conductive heating means of the heating unit comprises a current-shorted portion.

17. The heating element according to claim 1, further comprising:

a power supply unit.

18. A method of preparing a heating element, comprising:

forming two or more heating units, each heating unit comprising:

two busbars of a desired length; and a conductive heating line electrically connected to the two busbars on a transparent substrate and separating the busbars by a gap; and connecting the busbars of the respective heating units in series, wherein power per unit area of each heating unit is determined based upon the desired length of the respective busbars and does not correlate with the gap between the busbars of the respective heating unit.

19. The method of preparing a heating element according to claim 18, further comprising:

adhering an additional transparent substrate on the surface with the busbar and the conductive heating line.

20. A heating element for a vehicle or architecture comprising the heating element of claim 1.

21. A display device comprising the heating element of claim 1.

22. The display device according to claim 21, further comprising:

a surface temperature controller.

23. The display device according to claim 20, wherein the display device is a 3D display device.

24. The heating element of claim 1, wherein a first heating unit of the two or more heating units has busbars having a first length, a second heating unit of the two or more heating units has busbars having a second length, and the first length and the second length are different.

* * * * *